F. EGGE.
Animal-Trap.

No. 207,406. Patented Aug. 27, 1878.

WITNESSES
C Clarence Poole
Wm A. Skinkle

INVENTOR
Frederick Egge.
By his Attorneys.
Baldwin, Hopkins & Peyton.

N. PETERS, PHOTO-LITHOGRAPH, WASHINGTON, D. C.

UNITED STATES PATENT OFFICE.

FREDERICK EGGE, OF BRIDGEPORT, CONNECTICUT, ASSIGNOR TO THE SMITH & EGGE MANUFACTURING COMPANY, OF SAME PLACE.

IMPROVEMENT IN ANIMAL-TRAPS.

Specification forming part of Letters Patent No. 207,406, dated August 27, 1878; application filed January 19, 1878.

*To all whom it may concern:*

Be it known that I, FREDERICK EGGE, of Bridgeport, in the county of Fairfield and State of Connecticut, have invented certain new and useful Improvements in Animal-Traps, of which the following is a specification:

My invention relates to an animal-trap (chiefly designed for catching mice) of that class in which the trap is divided into two chambers or apartments—the one provided with a tilting platform operated by the weight of the animal and serving to trap the animal, and the other constituting a cage to secure the animal—the two communicating by a way or opening having a swinging gate or drop-door, which door, in its normal position, leaves the platform free to be tilted by the entrance of the animal, but when so tilted holds it to keep closed the entrance to the trap until the animal passes by the drop-gate to the cage, and in so doing releases the platform, which rocks and automatically resets the trap.

My objects are to simplify the construction, render more perfect in operation, and lessen the cost of such traps.

My improvements consist in certain novel constructions of parts, and in combinations of devices, which will hereinafter first be described, and then specifically designated by the claims.

Figure 1:
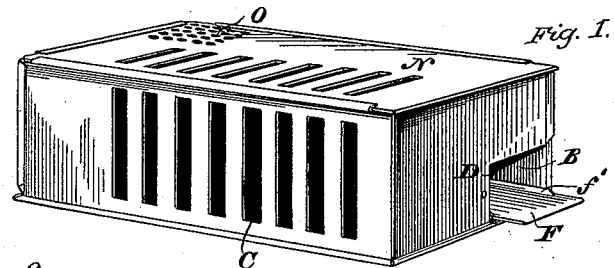
Figure 2:
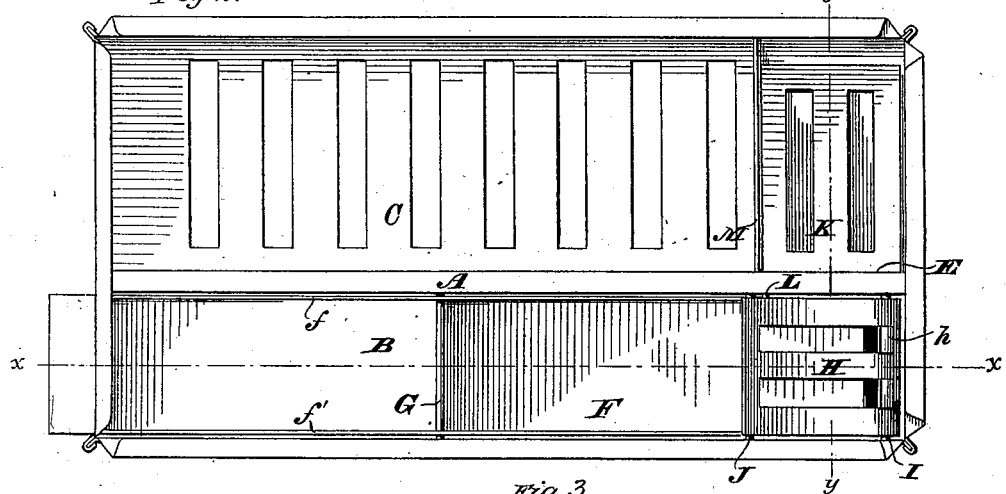
Figure 3:
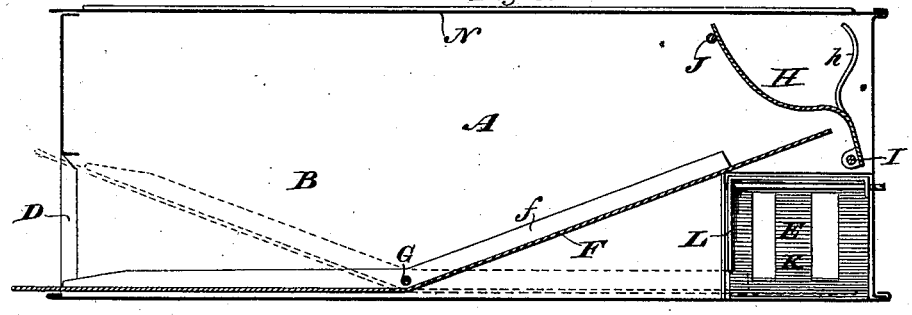
Figure 4:
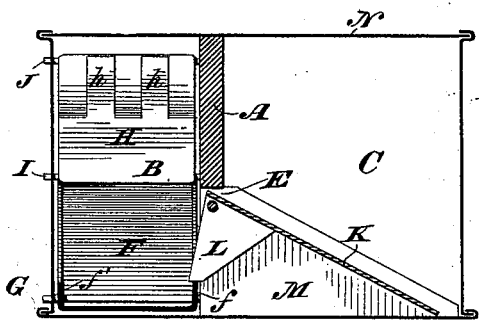

In the accompanying drawings, Figure 1 is a view in perspective, on a reduced scale, of the trap as set; Fig. 2, a plan or top view of the same with the top removed; Fig. 3, a vertical longitudinal section on the line $x\,x$ of Fig. 2, with the cover in place. The platform is shown in full lines as set and in dotted lines as tilted by the entrance of an animal. Fig. 4, a vertical transverse section on the line $y\,y$ of Fig. 2, showing the platform as tilted by the animal's weight and locked by the swing-gate.

The trap is, by preference, made of sheet metal—tinned iron, for instance—and is divided by a partition, A, into two parts, B C, respectively constituting a trapping-chamber or passage-way and a securing chamber or cage. An opening, E, between the two chambers, at the inner end or back of the trap, admits of the passage of the animal from the trapping-chamber to the cage.

The doorway or entrance to the trap is automatically closed by the weight of the animal as it passes into the trap, and upon and beyond the pivot of a tilting platform, F, the outer end of which projects through and slightly beyond the doorway D. This platform is of peculiar construction, being bent, (or it may be curved,) as shown by the drawings. By this angular form of the platform, I am enabled to fulcrum it upon a pivot, G, close to, or so as to rest at its angle upon, the floor of the trapping-chamber, and the platform may be made much shorter than a straight one could be, and yet give the requisite play to its front end to close the entrance, thus economizing space and material, and rendering unnecessary the employment of the separate swinging or sliding entrance-closing door commonly used in this class of traps. The outer or bent end of the platform from the pivot to the entrance is suitably counterbalanced, that it may normally be kept in the set position, with the straight longer end of the platform from the pivot inward elevated.

The relative lengths of the outer and inner ends of the platform, or those portions respectively extending to the front and back of the trap from the fulcrum, may, of course, be altered, and a more abrupt or a more gradual bend be given the platform, according to the length of the passage-way or trapping-chamber B, the height of the doorway, the size of the animal to be trapped, &c.

I prefer to form the platform somewhat of a trough shape—that is, with its bottom below the level of its upwardly-flanged or raised edges—to catch dirt, &c., and prevent it getting beneath the platform, from whence it could not readily be removed, and also to guard against impediment to the free working of the platform by the dirt getting clogged between the sides of the passage-way and the edges of the platform. The edge flanges $f\,f'$ (shown as formed by turning up the metal) give the desired trough-shape to the platform, and also serve to strengthen it and to form bearings for the pivot-rod G.

A bait holder or receptacle, H, at the inner end or back of the trapping-chamber, above the platform and opening E, may be formed in any suitable way. As shown, it is formed from sheet metal by slotting out and turning up the fingers h, and is hinged to the rod I, and prevented from rocking downward by the stop-rod J.

A slotted or open-work hinged gate or drop-door, K, rocks vertically upon a transverse pivot, or suitable hinge at top, so as to close the communicating opening E between the passage-way or platform trapping-chamber and the securing-cage. This door is provided with a heel or short arm, L, extending downward beneath its pivot, and projecting slightly into the trapping-chamber at the edge of the doorway E. At bottom this heel-extension of the gate terminates abruptly—that is, it has a square or straight-edged end adapted to overhang the edge of the inner end of the platform F. This heel-extension L of the gate is formed with it, or it may be directly and rigidly connected to it. I prefer to stamp the whole out of sheet metal, as shown.

A guard or low inclined partition, M, in the cage C, close to the swing-gate, serves to prevent the animals in the cage from getting beneath the gate; also renders it necessary for the animals, in passing from the platform-chamber to the cage, to raise the gate high enough to operate upon the platform, as will presently be explained, to reset the trap, and further allows the gate to be slightly swung upon the hinge in the descent of the platform without affording opportunity for an animal in the cage to pass beneath the gate.

A detachable cover, N, (shown as composed of sheet metal, and capable of sliding in suitable ways in the trap above the two chambers,) is perforated at O, above the bait-holder, to admit light. The cage C is also perforated or slotted to admit light, and thus induce the entrapped animal to pass by the drop-gate into the cage.

In operation, as an animal passes by the entrance-way into the trapping-chamber and upon the platform, its weight upon the inner end of the platform rocks it upon its pivot and closes the entrance. At the same time the inner end of the platform, having at its inner edge come beneath the heel of the swinging gate, (which yields and rocks slightly as the platform descends,) is held positively by the direct abutting of the heel part of the gate upon the platform, thus dispensing with all connections intermediate the gate and platform.

In passing from the trapping-chamber or from the platform to the cage, the animal raises the gate, and positively rocks its heel inward or away from the trapping-chamber, thus releasing the platform and resetting the trap by opening the entrance to the trapping-chamber by the tilting of the platform. This operation is repeated as often as an animal is caught.

To guard against the possibility of the success of an attempt of the animal to retreat from the trapping-chamber before the complete tilting of the platform—that is, were the animal to try to pass back as soon as it feels the platform yielding—it might be prevented from doing so by several ratchet-notches made in the gate-lever or heel-extension L, so that even should the animal succeed in getting back upon the bent or outer end of the platform before its inner end had completed its downward movement, the notch in the heel above the platform would abut against and hold it, so as to partially but sufficiently nearly close the entrance to prevent the escape of the animal, who would then advance again and be caged.

I am aware that numerous traps heretofore have been constructed with tilting platforms, with combined trapping-chambers, securing chambers or cages, tilting platforms, and passage-ways or openings between the chambers, provided with swinging or drop gates; also, that such swinging gates have, through independently-formed connections intermediate them and the tilting platforms, operated upon the platforms to hold them, when tilted by the animals, in position to prevent the escape of the animals by returning to the entrances, and that said gates, through the instrumentality of intermediate devices, such as weighted pivoted catches, swinging stops, jointed levers, connecting-hooks, &c., have been caused automatically to release the platforms and reset the traps by the swinging of the gates on the passage of the animals to the securing chambers or cages from the trapping-chambers. I therefore do not claim a swinging gate operating upon the platform through connections separate from or intermediate the gate and platform; nor do I broadly claim the combination of the two chambers, a tilting platform and a swinging gate.

I am not aware, however, of any invention prior to mine in this class in which a part or rigid attachment of the gate itself acts directly or positively upon the platform end, thereby avoiding complication by dispensing with auxiliary parts. Nor am I aware of any previously-invented trap showing the other peculiarities of construction and combinations of devices described by me, and hereinafter specifically claimed.

I claim as of my own invention—

1. The combination, with the trapping-chamber, of the tilting angular platform, pivoted at or near its middle close to the floor of said chamber, and serving, when tilted, to close the entrance thereto, as set forth.

2. The swinging gate constructed, as set forth, with a rigid heel-extension, and hinged across the opening between the two chambers, for the purpose specified.

3. The combination, with the trapping-chamber, of the tilting platform, extending lengthwise thereof and pivoted therein, and having raised edges or flanges $f\,f'$, as and for the purpose set forth.

4. The hereinbefore-described animal-trap, consisting of the two parallel chambers B C, the partition having the opening E between the chambers at the back of the trap, the tilting platform in the trapping-chamber, extending at its front end through the doorway D of said chamber, and the swinging gate K, hinged across the opening E between the chambers, and formed with the heel L, these parts being respectively constructed and relatively arranged as hereinbefore set forth.

In testimony whereof I have hereunto subscribed my name.

FREDERICK EGGE.

Witnesses:
 F. W. SMITH,
 CHARLES S. CANFIELD.